US010623594B2

(12) United States Patent
Sakamoto

(10) Patent No.: US 10,623,594 B2
(45) Date of Patent: Apr. 14, 2020

(54) MANAGEMENT SYSTEM AND METHOD

(71) Applicant: CANON KABUSHIKI KAISHA, Tokyo (JP)

(72) Inventor: Koji Sakamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 15/666,235

(22) Filed: Aug. 1, 2017

(65) Prior Publication Data

US 2018/0041647 A1 Feb. 8, 2018

(30) Foreign Application Priority Data

Aug. 5, 2016 (JP) ................. 2016-154835

(51) Int. Cl.
*H04N 1/00* (2006.01)
*G06F 3/12* (2006.01)
*H04L 29/08* (2006.01)
*G03G 15/00* (2006.01)

(52) U.S. Cl.
CPC ....... *H04N 1/00344* (2013.01); *G03G 15/553* (2013.01); *G06F 3/121* (2013.01); *H04L 67/10* (2013.01); *H04L 67/12* (2013.01); *H04L 67/125* (2013.01); *H04N 1/00034* (2013.01); *H04N 1/00082* (2013.01)

(58) Field of Classification Search
CPC ............ G06Q 10/083; G06Q 10/087; H04N 1/00344; H04N 1/00082; H04N 1/00034; H04L 67/10; H04L 67/12; H04L 67/125
USPC .............................. 358/1.11–1.18; 399/7–37
See application file for complete search history.

(56) References Cited

U.S. PATENT DOCUMENTS

| | | | | |
|---|---|---|---|---|
| 6,333,790 B1 * | 12/2001 | Kageyama | ............. | G06F 3/121 358/1.15 |
| 2002/0099630 A1 * | 7/2002 | Aruga | .................. | B41J 2/17509 705/28 |
| 2008/0201374 A1 * | 8/2008 | Oya | ..................... | G06Q 10/087 |
| 2011/0311243 A1 * | 12/2011 | Kawai | ............... | G03G 15/5079 399/28 |
| 2012/0069388 A1 * | 3/2012 | Nakatani | ................. | G06F 3/121 358/1.15 |
| 2017/0345080 A1 * | 11/2017 | Asai | ..................... | G06Q 10/083 |
| 2018/0024786 A1 * | 1/2018 | Miyazawa | ......... | H04N 1/00015 358/2.1 |

FOREIGN PATENT DOCUMENTS

| | | | |
|---|---|---|---|
| JP | 2003-39789 A | | 2/2003 |
| JP | 2003039789 A | * | 2/2003 |

* cited by examiner

*Primary Examiner* — Chad Dickerson
(74) *Attorney, Agent, or Firm* — Canon U.S.A., Inc. I.P. Division

(57) ABSTRACT

A management system that manages a plurality of network devices includes managing a delivery flag to manage delivery of each consumable for each of the plurality of network devices, receiving a first notification, from a network device, notifying that a remaining amount of a consumable has become small, where the notification includes remaining amount information about each consumable included in the network device, managing the remaining amount information for each consumable in the network device based on a content of the first notification, and determining the consumable to be delivered based on the first notification and the delivery flag.

7 Claims, 12 Drawing Sheets

FIG. 5

| NETWORK DEVICE ID | SETUP LOCATION | FINALLY RECEIVED COUNTER VALUE | USER ORGANIZATION ID |
|---|---|---|---|
| NE0001 | ○ CITY NO. 2 BLDG. | 100354 | U0001 |
| NE0002 | △ CITY □□ | 20492 | U0002 |
| ... | | | |

FIG. 6

| USER ORGANIZATION ID | CONSUMABLE MODEL NUMBER | COLLECTIVE DELIVERY DETERMINATION CONDITION | |
|---|---|---|---|
| U0001 | Cyan TONER | 21 ≥ | REMAINING AMOUNT (%) ≤ 30 |
| U0001 | Magenta TONER | 21 ≥ | REMAINING AMOUNT (%) ≤ 30 |
| U0001 | Yellow TONER | 21 ≥ | REMAINING AMOUNT (%) ≤ 30 |
| U0001 | Black TONER | 21 ≥ | REMAINING AMOUNT (%) ≤ 30 |
| U0015 | Cyan TONER | 21 ≥ | REMAINING AMOUNT (%) ≤ 40 |
| ... | | | |

FIG. 8

| NETWORK DEVICE ID | CONSUMABLE MODEL NUMBER | REMAINING AMOUNT INFORMATION | COLLECTIVE DELIVERY FLAG |
|---|---|---|---|
| NE0001 | Cyan TONER | 20 | FALSE |
| NE0001 | Magenta TONER | 75 | FALSE |
| NE0001 | Yellow TONER | 56 | FALSE |
| NE0001 | Black TONER | 26 | TRUE |
| NE0002 | Cyan TONER | 31 | FALSE |
| ... | | | ... |

800 801 802 803

MANAGEMENT SYSTEM AND METHOD

BACKGROUND

Field

The present disclosure relates to a technique for controlling management and delivery of consumables of a network device.

Description of the Related Art

A network device including an image forming apparatus (a multifunction peripheral (MFP)) includes a plurality of types of consumables including toners. Currently, a delivery automation system is used that transmits remaining amount information about the consumables from the network device to a management device connected thereto via the Internet to instruct a delivery company to deliver replacement consumables.

In the delivery automation system, the network device transmits a signal to the management device when a remaining amount of any consumable used on the network device has become small. Such a signal is referred to as a consumable remaining amount small notification. For example, when the remaining amount of Yellow (Y) toner becomes small, a signal referred to as a "Yellow toner remaining amount small notification" is transmitted.

In the delivery automation system, when remaining amounts of a plurality of types of consumables have become small, a request is made to collectively deliver new consumables corresponding thereto. Japanese Patent Application Laid-Open No. 2003-39789 discusses a method for determining, when the consumable remaining amount small notification has been received from a network device, whether a consumable in the network device and a consumable in another network device are collectively delivered from a delivery history. When the consumable remaining amount small notification has been received from a network device, collectively delivering the consumable and another consumable will be hereinafter referred to as "collective delivery".

In a system for performing the collective delivery, unless the collective delivery as well as delivery of a single consumable at the time of receiving the consumable remaining amount small notification is suppressed for consumables already delivered, double delivery can occur. In the system for performing the collective delivery, unless a condition under which delivery is not performed is appropriately determined from information about a history of products already delivered, delivery can be omitted when a remaining amount of a consumable has become small again.

Thus, to implement the collective delivery, a system for appropriately determining types and delivery timings of consumables to be delivered from respective use statuses and delivery statuses of the consumables is required.

SUMMARY

The present disclosure provides a system for enabling consumables in a network device to be appropriately collectively delivered while reducing the possibility that double delivery or omission of delivery occurs.

According to one aspect, a management system for managing a plurality of network devices includes a memory storing instructions and a processor that executes the instructions causing the management system to manage a delivery flag to manage delivery of each consumable for each of the plurality of network devices, receive a first notification, from at least one network device, notifying that a remaining amount of a consumable has become small, wherein the notification includes remaining amount information about each consumable included in the at least one network device, manage the remaining amount information for each consumable in the at least one network device based on a content of the first notification, determine, when the delivery flag for the consumable that the remaining amount of which was notified to have become small is invalid, the consumable as a delivery target without enabling the delivery flag for the consumable, determine, when a remaining amount of another consumable satisfies a delivery standard exists in the at least one network device that issued the first notification and the delivery flag for the another consumable is invalid, the another consumable as a delivery target and enable the delivery flag for the another consumable, and disable, when the delivery flag for the consumable that the remaining amount of which was notified to have become small is valid, the delivery flag for the consumable without determining the consumable as a delivery target.

Further features will become apparent from the following description of exemplary embodiments with standard to the attached drawings.

BRIEF DESCRIPTION OF THE DRAWINGS

FIG. 5 illustrates a network device information table.

FIG. 6 illustrates collective delivery determination condition table.

FIG. 8 illustrates a delivery management table.

DESCRIPTION OF THE EMBODIMENTS

Exemplary embodiments will be described below with reference to the drawings.

The present disclosure suggests a method for implementing a method for collectively delivering the consumables when remaining amounts of a plurality of types of consumables have become small in a network device including an image forming apparatus.

First, a system including a management system 103 to which an exemplary embodiment is applicable and a network device to be managed are described.

Figure 1:
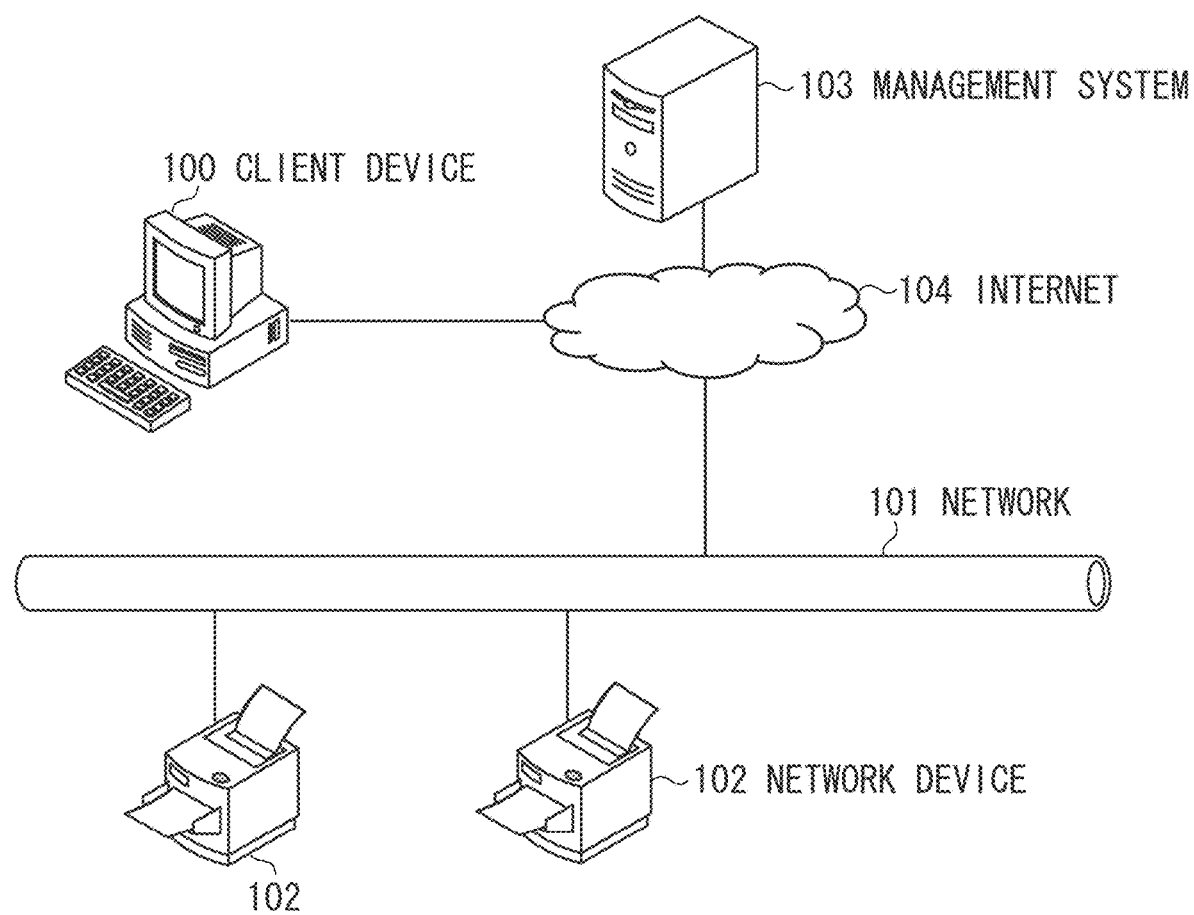
FIG. 1 is a configuration diagram of a system including a management system to which the present exemplary embodiment is applicable.

FIG. 1 illustrates a configuration of a system including the management system 103 to which the exemplary embodiment is applicable.

In the system illustrated in FIG. 1, the management system 103 is connected to network devices 102 to be managed which is connected to a network 101 such as a local area network (LAN) via the Internet 104, for example. FIG. 1 further illustrates a configuration in which a client device 100 which requests acquisition of information is connected to the management system 103 via the Internet 104.

The management system 103 centrally manages the network devices 102 in a customer environment. The management system 103 is set up on the Internet 104, for example, and can manage a plurality of network devices 102 dispersed in a plurality of local area networks 101.

The management system 103 may be a management device constituted by one device (e.g., a server), or may be constituted by a plurality of devices for each function. For example, the management system 103 may include a management information receiving device which receives management information from the network devices 102 and a consumable delivery management device. The consumable delivery management device acquires the management information from the management information receiving device, determines delivery of consumables, and notifies the client device 100. The management system 103 may include a cloud server.

An example of the network device 102 is an image forming apparatus including a printer function, a facsimile (FAX) function, and a copy function. The network device 102 can transmit to the management system 103 management information such as a number of printed sheets, a consumption amount of a consumable mounted on the network device 102, and version information about firmware. In the present exemplary embodiment, the network device 102 is the image forming apparatus as an example. However, this is only an example, and is not seen to limit an application range of the present embodiment. The network device 102 only needs to be a network device having consumables. In this case, a counter value such as a number of printed sheets described below, is a value obtained by counting a number of times of a predetermined operation in the network device 102.

The client device 100 is a terminal such as a personal computer (PC) for a person in charge in a sales company, for example, to perform an operation for the management system 103. Examples of the operation performed using the client device 100 include an operation for acquiring management information transmitted to the management system 103 from each of the network devices 102. The client device 100 can also receive a mail sent when the management system 103 has detected that an error or the like has occurred in each of the network devices 102. The client device 100 does not necessarily need to be a PC but may be an information processing apparatus having a similar function such as a portable terminal.

While a system including three types of devices has been illustrated in an example illustrated in FIG. 1, the system does not necessarily need to include the three types of devices in the present exemplary embodiment. While the number of local networks 101 is singular in the example illustrated in FIG. 1, the network 100 may be connected to a plurality of network environments via the Internet 104.

While the network device 102 directly transmits its own management information to the management system 103 in the configuration illustrated in FIG. 1, a configuration in which an agent device, which mediates communication for the network device 102, acquires information about the network device 102 and transmits the acquired information to the management system 103 may be used. Such an agent device may be assigned to one of the network devices 102 or may have a function of managing the plurality of network devices 102 on the local network 101.

A hardware configuration of each of the devices which cooperate with the management system 103 will be described below.

Figure 2:
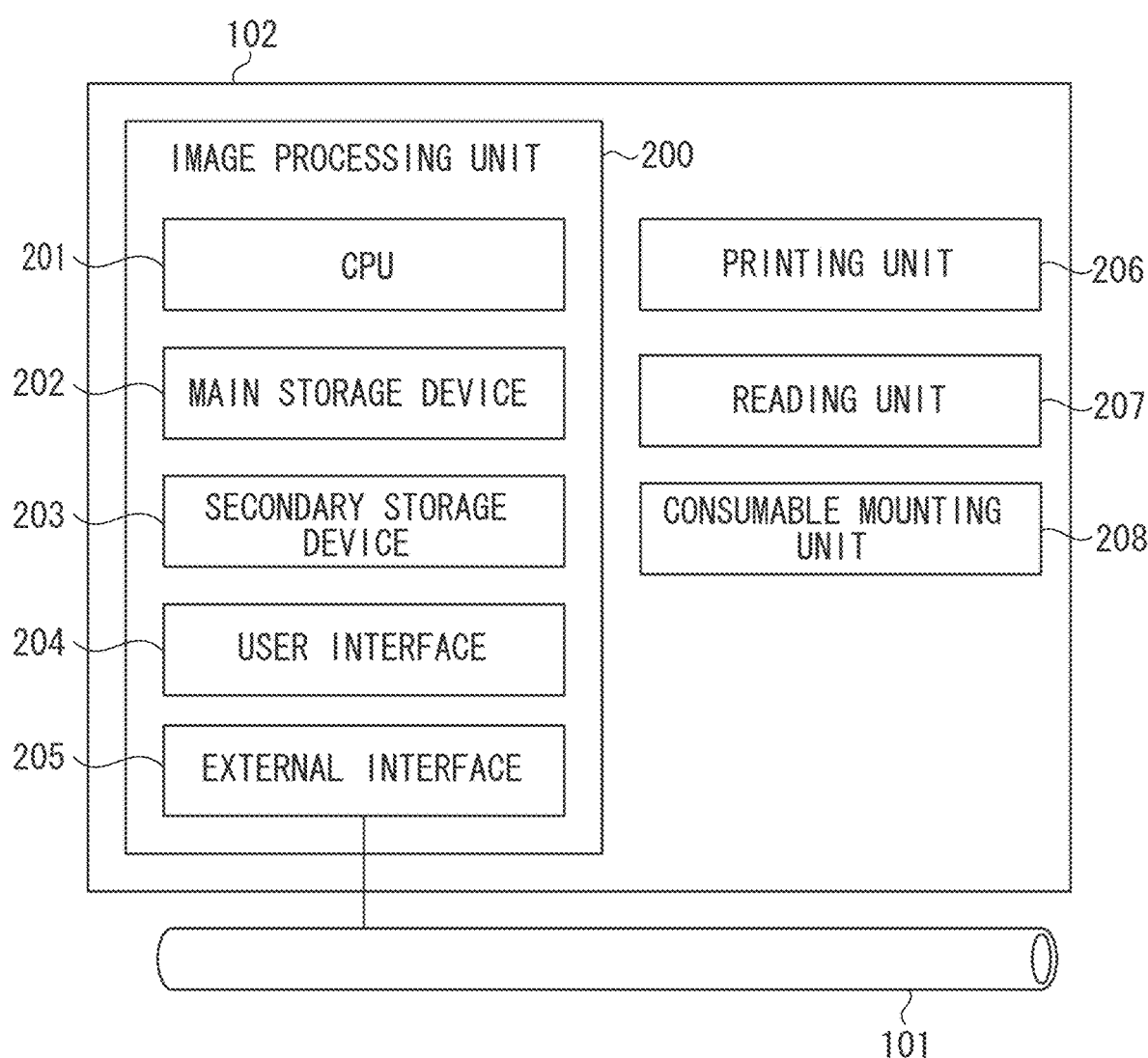
FIG. 2 is a hardware configuration diagram of a network device.

FIG. 2 is a block diagram illustrating a hardware configuration of the network device 102.

The network device 102 roughly includes an image processing unit 200, a printing unit 206, a reading unit 207, and a consumable mounting unit 208.

The image processing unit 200 includes a central processing unit (CPU) 201, a main storage device 202, a secondary storage device 203, a user interface 204, and an external interface 205.

The CPU 201 is a unit which executes a predetermined program and issues an instruction to perform various types of control of the network device 102.

The main storage device 202 is a work memory used when the CPU 201 executes a program, and is implemented by a random access memory (RAM). The secondary storage device 203 is a storage device intended to permanently store data, and is implemented by a nonvolatile storage device such as a hard disk drive (HDD) or a solid state drive (SSD). The secondary storage device 203 stores various programs such as an application program and an operating system (OS). The various programs stored in the secondary storage device 203 are loaded into the main storage device 202 when the CPU 201 executes the program.

The user interface 204 is a unit having a function of receiving operation input from a user, and is implemented by a touchable panel and an operation panel having a hard key or the like.

The external interface 205 is a network interface, for example, and can receive and transmit data from and to an external apparatus. For example, the external interface 205 can provide various types of management information about the network device 102, which have been recorded on the secondary storage device 203, to the outside via a protocol such as a Hypertext Transfer Protocol (HTTP) or a Simple Network Management Protocol (SNMP). Examples of the external apparatus include an external storage device such as an external hard disk drive (HDD) or a Universal Serial Bus (USB) memory, a computer connected via a network, and another network device. In the present exemplary embodiment, the external interface 205 is assumed to communicate with the management system 103 to exchange information.

The printing unit 206 is a hardware mechanism for performing image formation when functions such as a printing function and a copying function have been executed in the network device 102. The reading unit 207 is a hardware mechanism for converting a document including characters and pictures into electronic data when functions such as a printing function and a copying function have been executed in the network device 102.

The consumables mounting unit 208 is a unit which detects that a consumable container has been mounted on and removed from the network device 102, and has means for sequentially confirming a remaining amount of a consumable in the mounted consumable container using a light sensor or a weight sensor.

A hardware configuration of an information processing apparatus which can be the client device 100 and the management system 103 will be described below.

Figure 3:
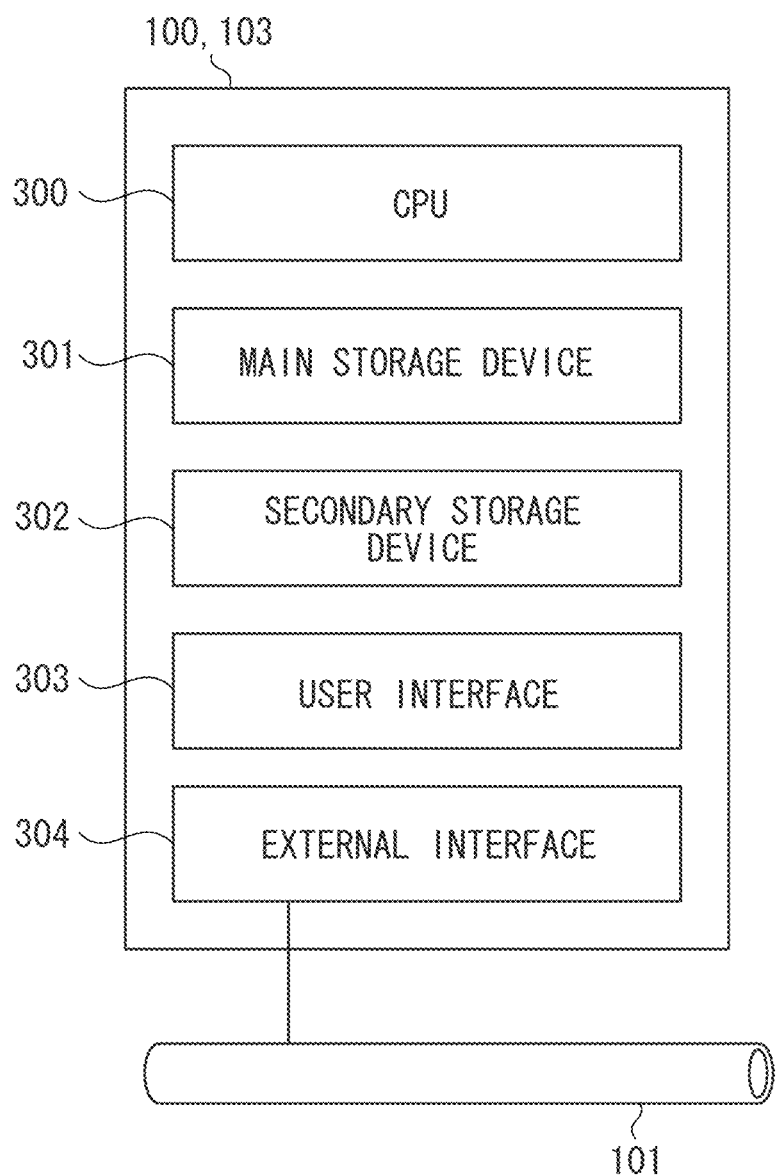
FIG. 3 is a hardware configuration diagram of an information processing apparatus which can constitute a management system.

FIG. 3 is a block diagram illustrating a hardware configuration of an information processing apparatus which can be the management system 103 and the client device 100.

The information processing apparatus includes a CPU 300, a main storage device 301, a secondary storage device 302, a user interface 303, and an external interface 304. The CPU 300 and the main storage device 301 are similar to those included in each of the network devices 102, and hence details thereof are omitted.

The secondary storage device 302 is implemented by a nonvolatile storage device such as a HDD or an SSD, and stores various programs including an application program and an OS. In the management system 103, the secondary storage device 302 stores various types of data including a printing history, setting value information about the network device 102, and consumable information about the network device 102.

The user interface 303 is a unit having a function of receiving operation input from the user and a function of notifying the user. For example, the user interface 303 can receive a signal corresponding to an operation by the user using a keyboard, a mouse, or the like. The user interface 303 can output a notification to the user using a display or the like.

The external interface 304 is connected to the Internet 104, and enables communication with other devices.

A software configuration of each of devices which cooperate with the management system 103 will be described below.

Figure 4:
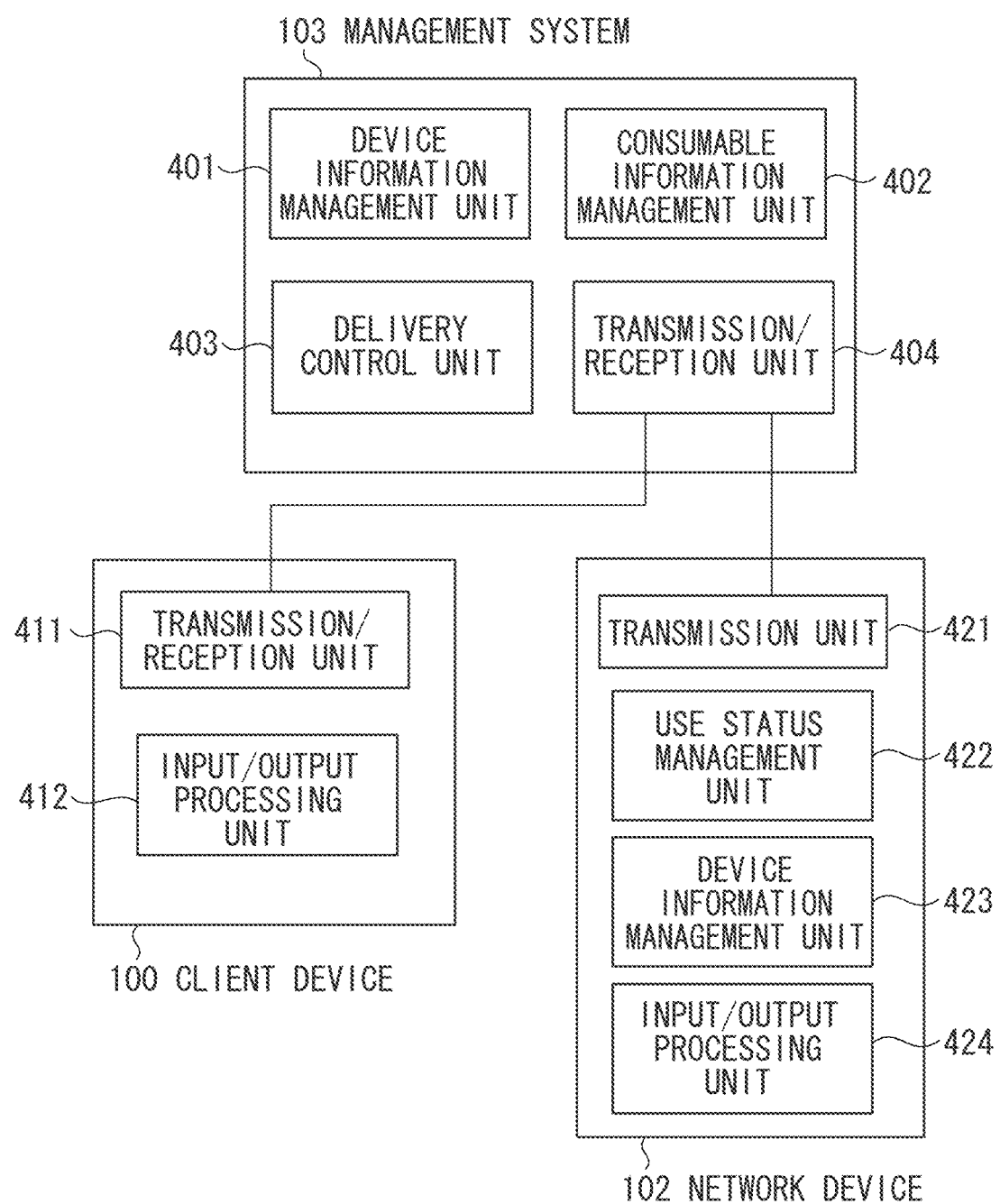
FIG. 4 illustrates a software configuration diagram of a system according to the present exemplary embodiment.

FIG. 4 is a block diagram illustrating a software configuration of the system according to the present exemplary embodiment.

A software configuration of the network device 102 will be described below.

The network device 102 includes functional units such as a transmission unit 421, a use status management unit 422, a device information management unit 423, and an input/output processing unit 424. The functional units are implemented when the CPU 201 in the network device 102 reads out a program stored in the secondary storage device 203 and executes the read program.

The transmission unit 421 communicates with the management system 103 via the Internet 104, and transmits information about the network device 102 itself to the management system 103.

The use status management unit 422 stores and manages a print processing execution history in the network device 102, an error on the network device 102, notification information about an alarm and a paper jam, and information about a consumption of each consumable. The use status management unit 422 stores and manages a number of printed sheets in the network device 102 as a counter value, and updates the counter value when print processing has been performed. The use status management unit 422 can store a plurality of types of counter values obtained by counters such as a total counter for counting printed sheets regardless of the type of printing and a color counter for counting printed sheets obtained only by color printing. Further, the use status management unit 422 can detect, when a consumable container has been replaced with another consumable container, that another consumable container has been mounted and record and manage a detection result as a history, and notify the history to the exterior via the transmission unit 421.

The device information management unit 423 stores and manages network setting information such as a serial number, a Media Access Control (MAC) address, and a global Internet Protocol (IP) address of the network device 102, and version information about firmware.

The input/output processing unit 424 displays information on a panel via the user interface 204 and the external interface 205 which are loaded on the network device 102, and receives an input operation by the user or a person in charge of maintenance.

A software configuration of the client device 100 will be described below.

The client device 100 includes functional units such as a transmission/reception unit 411 and an input/output processing unit 412. The functional units are implemented when the CPU 300 in the information processing apparatus constituting the client device 100 reads out the programs stored in the secondary storage device 302 to the main storage device 301 and executes the read programs.

The transmission/reception unit 411 has a function of exchanging information with the management system 103 via the Internet 104.

The input/output processing unit 412 performs processing for receiving input from the user and presenting information to the user. A general web browser corresponds to the input/output processing unit 412 when the client device 100 is a PC. An example of the input/output processing unit 412 in the present exemplary embodiment is not limited to the foregoing.

A software configuration of the management system 103 will be described below.

The management system 103 includes functional units such as a device information management unit 401, a consumable information management unit 402, a delivery control unit 403, and transmission/reception unit 404. The functional units are implemented when the CPU 300 reads out the programs stored in the secondary storage device 302 to the main storage device 301 and executes the read program, in one or more information processing apparatuses constituting the management system 103.

The device information management unit 401 manages information about each of the network devices 102 to be managed by the management system 103 using a database. The information about the network device 102 to be managed will be described below.

The consumable information management unit 402 manages information about a list of consumables mounted on the network device 102 using a database.

The delivery control unit 403 determines the consumable to be delivered to the network device 102 from information about remaining amounts of the consumables in the network device 102.

The transmission/reception unit 404 communicates with the client device 100 and the network device 100 via the Internet 104, receives information and accepts a request for information, and notifies the client device 100 of a consumable delivery instruction, as needed. The management system 103 can receive various notifications such as the consumable remaining amount small notification from the network device 102 using the transmission/reception unit 404.

FIG. 5 illustrates a network device information table included in the device information management system 401. The device information management unit 401 holds a list of network devices 102 managed by the management unit 103 and relevant information in the network device information table. The device information management unit 401 updates the information received from the network device 102 and information held in the network device information table, as needed, in response to an updating request from the client device 100.

A network device identifier (ID) 500 is an identifier for uniquely identifying the network device 102. A setup location 501 is information about a location where the network device 102 is arranged. A finally received counter value 502 stores a counter value finally received from the network device 102. A user organization ID 503 is an identifier for uniquely identifying an organization to which the user of the network device 102 belongs. The information in the network device information table is registered in the management system 103 by a person in charge of maintenance in a sales company before the network device 102 serving as a target starts to be used.

FIG. 6 illustrates a collective delivery determination condition table for consumables included in the consumable information management unit 402.

A user organization ID 600 is an identifier for performing association with the user organization ID 503 illustrated in FIG. 5. A consumable model number 601 is an identifier assigned for each consumable type. If the network device 102 is a printer, the consumables may differ in color and content depending on the consumable type. Information about the consumables can be managed by the consumable model number 601. While a name of a consumable model number associated with a color, for example, "Yellow toner", is used for the purpose of description in the present exemplary embodiment, a mere number may also be used.

The collective delivery determination condition 602 is a condition for determining collective delivery of consumables. In the present exemplary embodiment, a condition for performing collective delivery is "a remaining amount of a target consumable is within a specific range", and the collective delivery determination condition 602 is "21≤remaining amount (%)≤30", for example. The collective delivery determination condition 602 can be set for each user organization ID to appropriately set a condition for performing collective delivery in consideration of respective time periods required to deliver consumables because respective distances of the consumables from a consumable delivery base differ depending on a user organization. The collective delivery determination condition 602 can be set for each consumable model number because respective contents of the consumables differ depending on the consumable type so that an appropriate delivery timing needs to be set for each of the consumables.

In the collective delivery determination condition table, a setting of an appropriate collective delivery determination condition is previously registered for the user organization ID 600 and the consumable model number 601 by a person in charge of maintenance or respective persons in charge in sales companies of the network device 102 and the consumables. A method for determining collective delivery using the collective delivery determination condition table will be described below.

Figure 7:
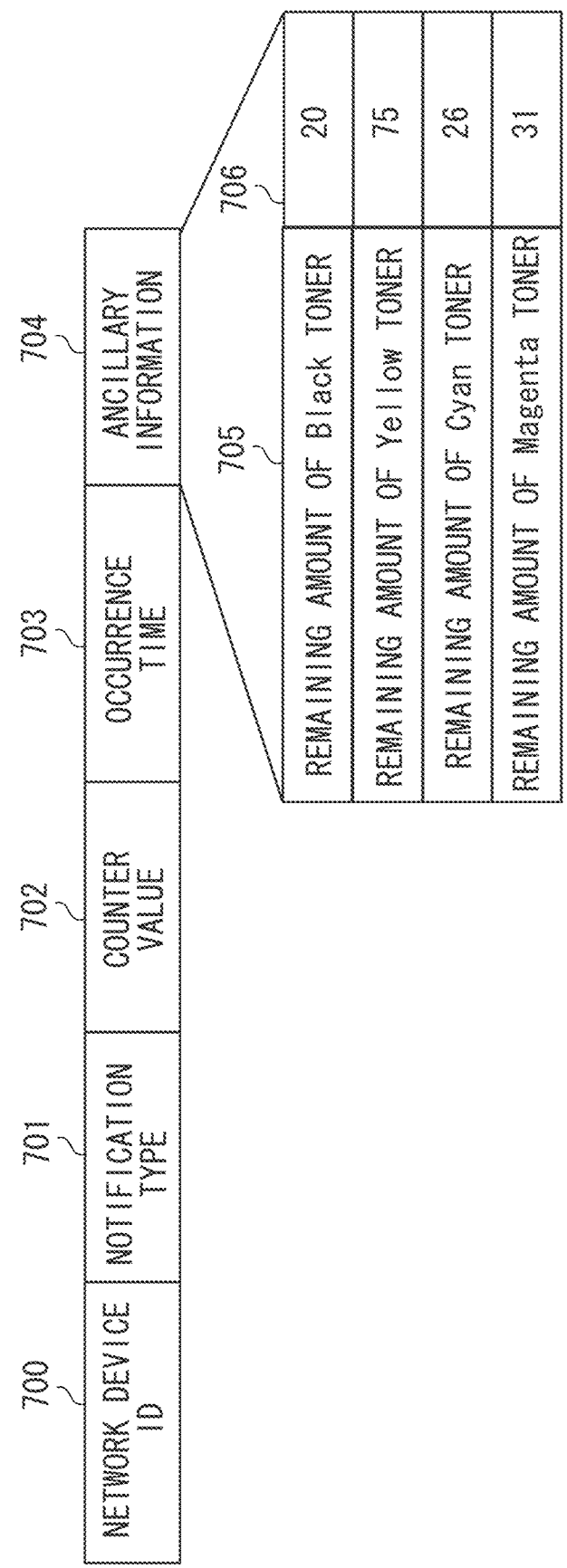
FIG. 7 illustrates a data structure of a notification signal transmitted from the network device to the management system.

FIG. 7 illustrates a data structure of a notification signal transmitted from the network device 102. A method for transmitting such a data structure via the Internet includes describing the data structure in an Extensible Markup Language (XML) and implementing the described data structure using a Simple Object Access Protocol (SOAP) as a communication protocol.

The data structure includes a network device ID 700, a notification type 701, and a counter value 702. In the present exemplary embodiment, the consumable remaining amount small notification is taken as the notification type 701. The notification type 701 is information identifying the type of the consumable the remaining amount of which has become small, for example, "Black toner remaining amount small notification". The counter value 702 is a value of the network device 102 at the time point when it has been detected that the remaining amount of the consumable has become small. While the number of types of counter values is only one in the present exemplary embodiment, a list of a plurality of counter values such as a counter value in color printing, a counter value in monochrome printing, and a counter value obtained by summing up both counter values may be stored.

The data structure further includes an occurrence time 703 and ancillary information 704. The occurrence time 703 corresponds to the date on which the notification has occurred. Remaining amount information about the consumable is described in the ancillary information 704. For example, a state where the remaining amount of the consumable is 10% or 50% is assumed. The ancillary information 704 includes consumable type information 705 and remaining amount information 706.

An example illustrated in FIG. 7 is a "Black toner remaining amount small notification" issued when the remaining amount of Black toner has become 20%, and remaining amount information about toner other than the Black toner also represents a data structure attached to the ancillary information 704. The consumable remaining amount small notification is transmitted to the management system 103 only once for each of the consumables when the remaining amount of the consumable has become a predetermined amount or less (e.g., 20% or less) on the network device 102. If the consumable is replaced with a new consumable, the consumable remaining amount small notification can be issued again for the consumable.

FIG. 8 illustrates a delivery management table included in the delivery control unit 403 in the management system 103.

The delivery management table stores information about a network device ID 800 and a consumable model number 801 in association.

Remaining amount information (%) 802 is remaining amount information about each of the consumables attached to the above-described consumable remaining amount small notification which is notified from the network device 102.

A collective delivery flag 803 is a flag for managing operation of collective delivery of the consumables. In the collective delivery flag 803, "TRUE" indicates that collective delivery has been carried out, and "FALSE" indicates that collective delivery has not yet been carried out.

The delivery management table previously stores a list of respective network device IDs 800 of the network devices 102 to be managed and respective information about consumable model numbers 801 of the consumables corresponding thereto. While information in the collective delivery flag 803 is "FALSE" in an initial state, the information shifts to "TRUE" and "FALSE" through processing in a flowchart illustrated in FIG. 9, described below. Information in the remaining amount information (%) 802 is updated through the processing in the flowchart illustrated in FIG. 9, described below, from the initial state.

Figure 9:
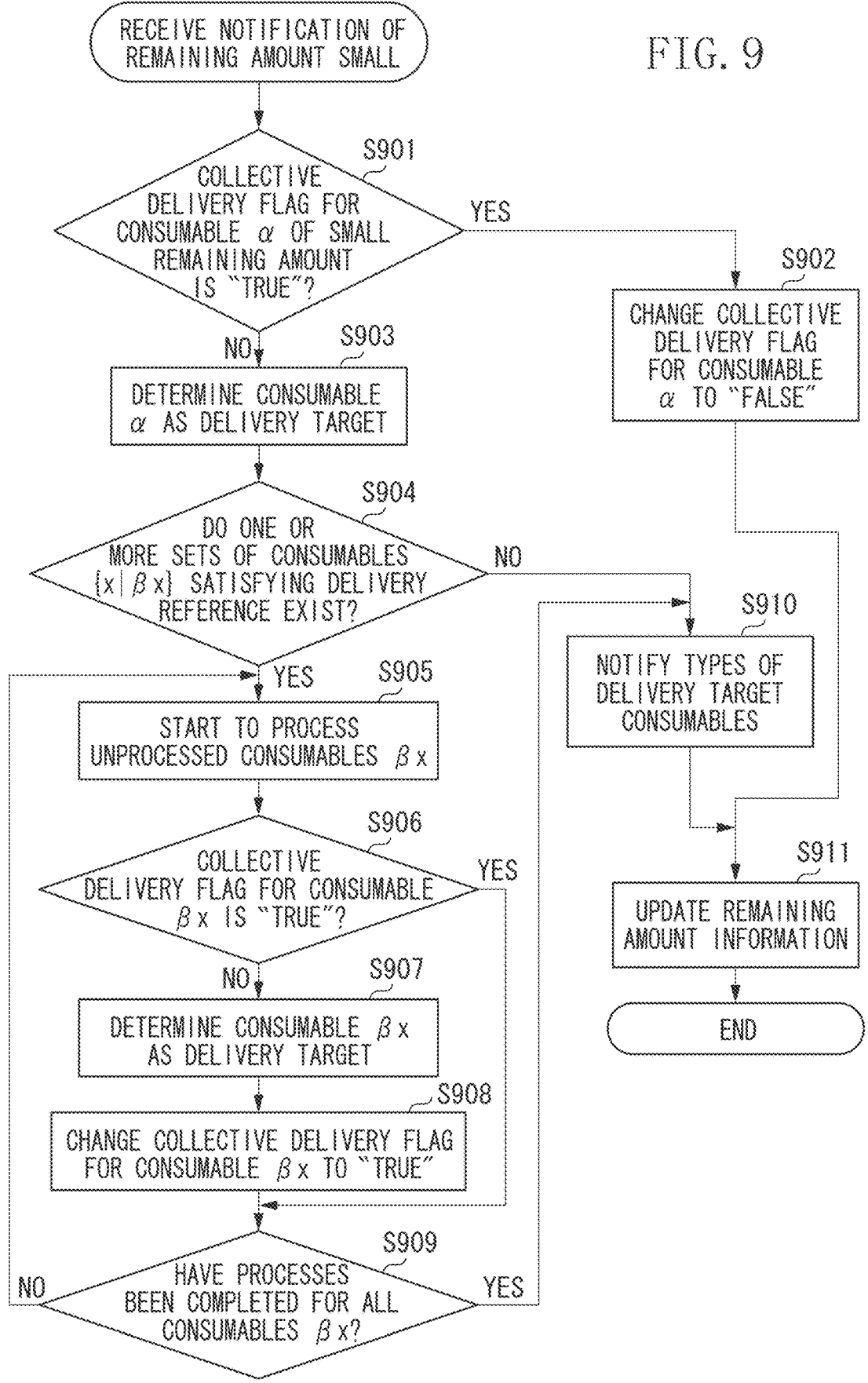
FIG. 9 is a flowchart illustrating delivery control processing according to a first exemplary embodiment.

FIG. 9 is a flowchart for illustrating processing relating to collective delivery (delivery control processing) according to a first exemplary embodiment. The processing in the flowchart is carried out when the CPU 300 reads out a program (a program for collective delivery) stored in the secondary storage device 302 into the main storage device 301 and executes the read program in the one or more information processing apparatuses constituting the management system 103. More specifically, all processing steps in the flowchart are executed by the management system 103.

The management system 103 starts the processing in the flowchart upon receiving the consumable remaining amount small notification from the network device 102.

In step S901, the delivery control unit 403 confirms the collective delivery flag 803 in the delivery management table included in the delivery control unit 403 for a consumable α a remaining amount of which is small in the consumable remaining amount small notification. The consumable α represents the consumable model number 801 such as Black toner.

If the delivery control unit 403 determines that the collective delivery flag 803 for the consumable α is "TRUE" (YES in step S901), the delivery control unit 403 determines that a collective delivery instruction has been previously issued to the consumable α, and the processing proceeds to step S902. In step S902, the delivery control unit 403 changes the collective delivery flag 803 for the consumable α in the delivery management table to "FALSE", and the processing proceeds to step S911. The process in step S911 will be described below.

On the other hand, if the delivery control unit 403 determines that the collective delivery flag 803 for the consumable α is "FALSE" (NO in step S901), the delivery control unit 403 determines that the collective delivery instruction has not yet been issued to the consumable α, and the processing proceeds to step S903. In step S903, the delivery control unit 403 designates the consumable α as a delivery instruction target (determines the consumable α as a delivery target). The delivery control unit 403 keeps the collective delivery flag 803 for the consumable α "FALSE" (does not enable the collective delivery flag 803).

In step S904, the delivery control unit 403 compares remaining amount information about consumables other than the consumable α in the ancillary information 704 of the received consumable remaining amount small notification, with the collective delivery determination condition table, and determines whether one or more consumables βx satisfying a collective delivery standard exist among the consumables other than the consumable α. The consumable βx represents the consumable model number 801.

If the delivery control unit 403 determines that the one or more consumables βx satisfying the collective delivery standard exist (YES in step S904), the processing proceeds to step S905.

In step S905, the delivery control unit 403 first determines, as for processing in steps S906 to S908 for determining whether the consumable is to be delivered, the unprocessed consumable βx as a processing target in steps S906 to S908.

In step S906, the delivery control unit 403 confirms the collective delivery flag 803 for the consumable βx to be processed in the delivery management table, and determines whether the collective delivery flag 807 is "TRUE".

If the delivery control unit 403 determines that the collective delivery flag 803 for the consumable βx to be processed is "FALSE" (No in step S906), the processing proceeds to step S907. In step S907, the delivery control unit 403 determines that the consumable βx to be processed is a delivery target, and the processing proceeds to step S908. In step S908, the delivery control unit 403 changes the collective delivery flag 803 for the consumable βx to be processed in the delivery management table, to "TRUE" (enables the collective delivery flag 803), and the processing proceeds to step S909.

On the other hand, if the delivery control unit 403 determines that the collective delivery flag 803 for the consumable βx to be processed is "TRUE" (YES in step S906), the processing proceeds to step S909.

In step S909, the delivery control unit 403 confirms whether the processes in steps S906 to S908 have been completed for all the consumables βx satisfying the collective delivery standard. If the delivery control unit 403 determines that the consumables βx for which the processes in steps S906 to S908 have not yet been performed, exist (NO in step S909), the processing returns to step S905.

On the other hand, if the delivery control unit 403 determines that the processes in steps S906 to S908 have been completed for all the consumables βx satisfying the collective delivery standard (YES in step S909), the processing proceeds to step S910.

If the delivery control unit 403 determines that the consumables βx satisfying the collective delivery standard do not exist (NO in step S904), the processing proceeds to step S910.

In step S910, the delivery control unit 403 transmits an instruction to deliver the consumable α which has come to be delivered in step S903 and the consumable βx which has come to be delivered in step S907, and the processing proceeds to step S911.

In step S911, the delivery control unit 403 updates the remaining amount information (%) 802 in the delivery management table using the ancillary information 704 corresponding to the received consumable remaining amount small notification, and the processing in the flowchart ends.

As one example, a management device which receives a notification from the network device 102 and performs only processing for determining whether a notification is the consumable remaining amount small notification, a management device which receives data representing the consumable remaining amount small notification and performs delivery determination processing in steps S901 to S909, and a management device which issues an instruction to deliver consumables to be delivered and the like, may separately exist. A method for transmitting the type of the consumable which have come to be delivered in step S910 (a method for issuing a delivery instruction) includes a method for the management system 103 to give out a function of acquiring information using a web application Programming Interface (API). When the web API is used, the client device 100 can request information about the consumable to be delivered, from management system 103 via the Internet 104. The method further includes issuing a delivery instruction to the client device 100 using an electronic mail. A method for actually ordering the consumable, based on information about the consumable to be delivered, will be described below.

Determination of collective delivery processing using the flowchart illustrated in FIG. 9 will be described below using specific data.

In an initial state, information in the collective delivery flags 803 are all "FALSE". First, the management system 103 receives a "Magenta toner remaining amount small notification" from the network device 102. At this time, remaining amounts of other toners, i.e., Black toner, Yellow toner, and Magenta toner, and Cyan toner in the ancillary information 704 are respectively "60%", "22%", "20%", and "40%".

Since the information in the collective delivery flag 803 for the Magenta toner is "FALSE", the management system 103 determines the Magenta toner as a delivery target. At this time, the management system 103 keeps the information in the collective delivery flag 803 for the Magenta toner "FALSE" as it is (i.e., does not enable the collective delivery flag 803 for the Magenta toner). The management system 103 also sets the Yellow toner the remaining amount of which satisfies the collective delivery determination condition 602, as a delivery target. The management system 103 sets "TRUE" in the collective delivery flag 803 for the Yellow toner which is to be simultaneously delivered (i.e., enables the collective delivery flag 803 for the Yellow toner). Further, the management system 103 updates information in the remaining amount information (%) 802.

Then, the management system 103 receives a "Yellow toner remaining amount small notification". At this time, respective information about the remaining amounts of the consumables, i.e., Black toner, Yellow toner, and Magenta toner, and Cyan toner stored in the ancillary information 704 are respectively "40%", "20%", "15%", and "22%". At this time, the collective delivery flag 803 is "TRUE" for the Yellow toner. Therefore, the management system 103 does not set the Yellow toner as a delivery target. The management system 103 sets the collective delivery flag 803 for the Yellow toner to "FALSE" (i.e., disables the collective delivery flag 803 for the Yellow toner). In this case, the management system 103 does not set the Magenta toner as a delivery target, although the Magenta toner satisfies the collective delivery determination condition 602.

A consumable monitoring/ordering screen 1000 provided by the management system 103 and displayed via the user interface 303 in the client device 100 in response to a request from the client device 100 of a person in charge of delivery will be described below with reference to FIG. 10.

Figure 10:
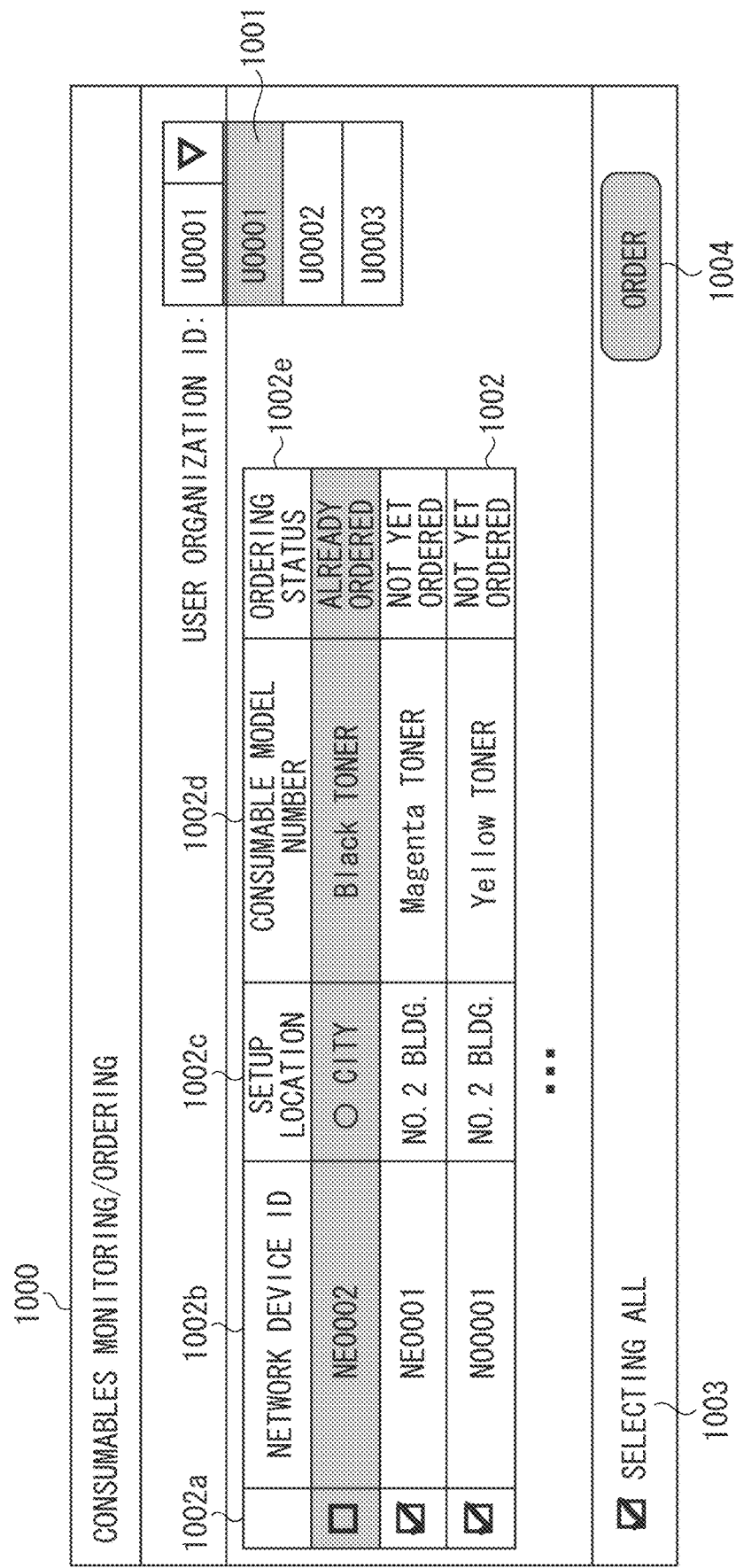
FIG. 10 illustrates a consumable monitoring/ordering screen.

FIG. 10 illustrates the consumable monitoring/ordering screen 1000.

In the consumable monitoring/ordering screen 1000, via a user organization ID selecting pull-down list 1001, a user organization ID to be displayed is selectable. In a delivery instruction target list 1002, consumables notified as a delivery target in step S910 in FIG. 9 described above, are displayed.

The delivery instruction target list 1002 includes a network device ID 1002*b*, a setup location 1002*c*, a consumable model number 1002*d*, an ordering status 1002*e*, and a check box 1002*a*. In the delivery instruction target list 1002, management can be performed as to whether each of the consumables has already been ordered according to the ordering status 1002*e*.

The delivery instruction target list 1002 includes the check box 1002*a* for selecting the consumables to be ordered. Further, a "select all" check box 1003 makes all the consumables, which have not yet been ordered, selectable. Via an "order" button 1004, processing for ordering the consumable selected by the check box 1002*a* can be performed. When an instruction to perform the ordering processing has been issued from the consumable monitoring/ordering screen 1000, the management system 103 performs the ordering processing, and notifies a delivery company of an ordering content. A method for ordering the consumables may be any method. As described above, a person in charge may issue an instruction to order consumables online via the client device 100 or a person in charge who has browsed information about consumables to be delivered which has been determined in FIG. 9, may order the consumables offline. Alternatively, the management system 103 may send an order automatically (without a person in charge issuing a manual instruction) to a delivery system (not illustrated), based on information about consumables to be delivered which has been determined in FIG. 9.

According to the present exemplary embodiment, when the remaining amount of a certain type of consumable has become small, another consumable the remaining amount of which is small is confirmed and it can be determined whether another consumable is to be a delivery target in steps S904 to S909 illustrated in FIG. 9. As for the consumables which have already been collectively delivered, the collective delivery flag 803 is set valid ("TRUE") in step S908, and the collective delivery flag 803 is confirmed in step S906 so that the consumables to be delivered can be prevented from being doubly delivered. Further, if the remaining amount small notification has been issued for the consumables which have already been collectively delivered, the collective delivery flag 803 is set invalid ("FALSE") in step S902 so that the possibility that omission of delivery occurs can be reduced. When the above-described mechanisms are combined, the consumables can be more appropriately delivered to the network device 102. More specifically, according to the present exemplary embodiment, since it is determined whether consumables in the network device 102 are to be delivered depending on their remaining amounts or which type of consumable is to be delivered, the consumables can be appropriately collectively delivered while reducing the possibility that double delivery or omission of delivery occurs.

A second exemplary embodiment will be described as below. As described above, according to the first exemplary embodiment, the collective delivery flag 803 is managed to enable appropriate collective delivery of the consumables. In the first exemplary embodiment, the collective delivery flag 803 is erased when the remaining amount small notification for the corresponding type of consumable has been received from the network device 102 (see in step S902 illustrated in FIG. 9).

After the collective delivery is carried out and the collective delivery flag 803 is set and before the remaining amount small notification is issued, a new consumable may be delivered and mounted in the network device 102. In this case, the remaining amount small notification is not issued. Therefore, processing for changing the collective delivery flag 803 to "FALSE" is not appropriately performed, so that omission of delivery may occur.

According to a second exemplary embodiment, a configuration considering this point will be described below. As for a configuration similar to the first exemplary embodiment, description is omitted, and only a difference therebetween will be described below.

A network device 102 according to the second exemplary embodiment can detect that a consumable container has been mounted and feed a signal notifying a management system 103 that the consumable container has been mounted. Such a notification signal is hereinafter referred to as a "consumable container mounting notification".

To transmit the "consumable container mounting notification", the network device 102 can detect that a newly delivered consumable has been mounted. More specifically, the network device 102 can determine that a new consumable has not been mounted, when a consumable container once drawn out of an apparatus by a user has been mounted again. A mechanism for the network device 102 to send a consumable container mount notification is as follows when a new consumable has been mounted.

A case where bar codes or electronic memories are attached to consumable containers and a unique identifier is attached to each of the consumable containers will be described below.

When the user mounts the consumable container and closes a cover, the network device 102 reads the identifier from the bar code or the electronic memory in the mounted consumable container. Then, the network device 102 determines whether the consumable container to which the identifier is attached has been mounted in the past from a history, and transmits, when the consumable container has not been mounted in the past, a consumable container mounting notification.

A case where a unique identifier is not assigned to the consumable container will be described below.

In this case, in a situation where the remaining amount of the consumable is small (e.g., the remaining amount is 20% or less), the user draws out the consumable container. Then, when the user mounts the consumable container and closes the main body cover, the network device 102 confirms the remaining amount of the consumable inside the mounted consumable container. When it can be confirmed that the remaining amount of the consumable is sufficiently large (i.e., the remaining amount is not small), the network device 102 transmits a consumable container mount notification.

The transmission of the consumable container mounting notification is not necessarily limited to when it is detected that a new consumable has been mounted. Even when a new consumable which is not a new product but is different from the removed consumable, has been mounted (e.g., when a toner cassette used for test printing in another device has been mounted), a consumable container mounting notification is also transmitted. Such a consumable is also included when represented below as a "new product".

A data structure of a consumable container mounting notification is similar to the data structure illustrated in FIG. 7 in the first exemplary embodiment. A "notification type" 701 in the consumable container mounting notification includes information about the type of the mounted consumable, for example, "BLACK toner mounting".

Figure 11:
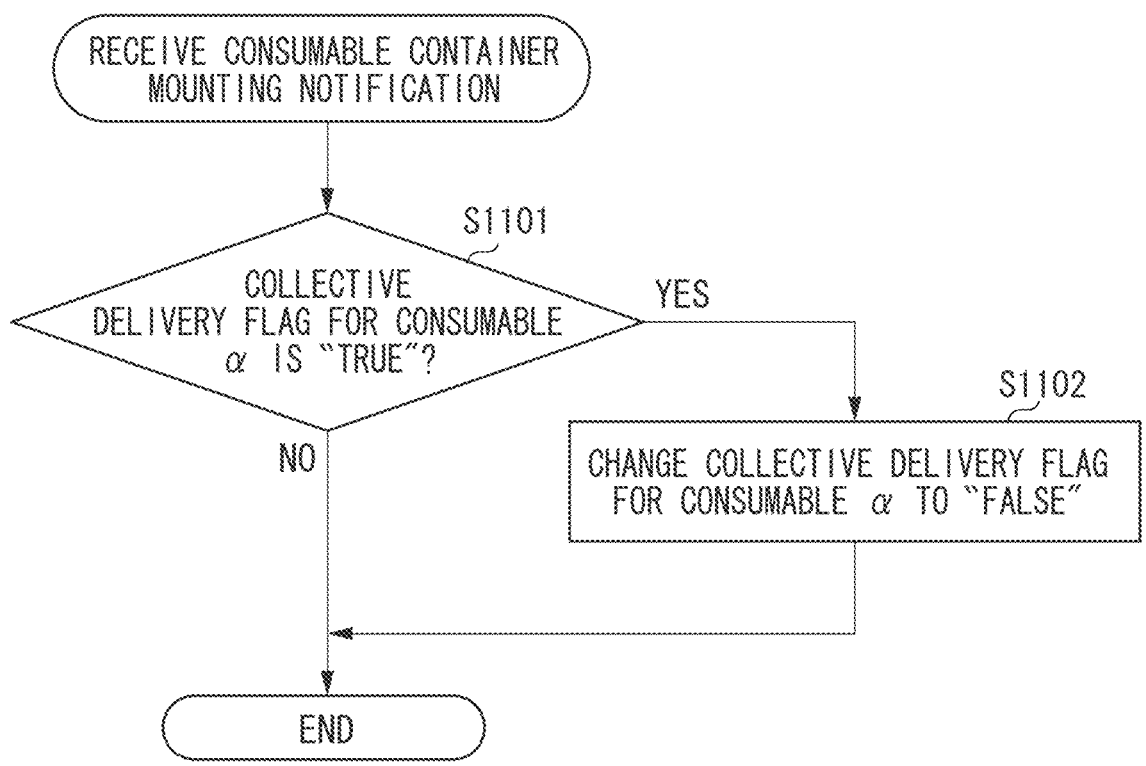
FIG. 11 is a flowchart illustrating collective delivery flag control processing according to a second exemplary embodiment.

FIG. 11 is a flowchart for illustrating control of a collective delivery flag, which is performed by a delivery control unit 403 when the management system 103 has received a consumable container mounting notification from the network device 102. In the second exemplary embodiment, processing performed when the consumable remaining amount small notification illustrated in FIG. 9 in the first exemplary embodiment, has been received and processing performed when a consumable container mounting notification described in FIG. 11, are combined to implement more appropriate consumable collective delivery. The processing in the flowchart is implemented when a CPU 300 reads out a program stored in a secondary storage device 302 into a main storage device 301 and executes the read program in one or more information processing apparatuses constituting the management system 103. More specifically, the management system 103 executes all processing steps in the flowchart.

The management system 103 starts the processing in the flowchart upon receiving the consumable container mounting notification from the network device 102. The management system 103 starts the processing in the flowchart illustrated in FIG. 9, similar to the first exemplary embodiment, when it has received the consumable remaining amount small notification from the network device 102.

In step S1101, the delivery control unit 403 confirms a collective delivery flag 803 on a delivery management table for a consumable α which has been mounted as a new product according to a consumable container mounting notification, and determines whether the collective delivery flag 803 is "TRUE".

If the delivery control unit 403 determines that the collective delivery flag 803 for the consumable α is "TRUE" (YES in step S1101), the processing proceeds to step S1102. In step S1102, the delivery control unit 403 changes the collective delivery flag 803 for the consumable α to "FALSE", and the processing in the flowchart ends.

On the other hand, if the delivery control unit 403 determines that the collective delivery flag 803 for the consumable α is "FALSE" (No in step S1101), the processing in the flowchart directly ends as it is.

As described above, according to the second exemplary embodiment, when the detection method of mounting the new consumable container in the network device 102 is employed, the collective delivery flag 803 for the consumable can be appropriately controlled, the possibility that omission of delivery occurs is reduced, and more appropriate collective delivery can be performed.

A third exemplary embodiment will be described as below. In the above-described second exemplary embodiment, a case where the network device 102 can determine the mounting of the new consumable has been illustrated. However, some network device 102 does not include a configuration in which mounting of a new consumable is detected to notify a management system 103. In a third exemplary embodiment, a configuration using information about a remaining amount included in the consumable remaining amount small notification and a counter value calculated from the number of printed sheets will be described, which implements collective delivery of consumables targeted to such a network device.

A remaining amount of a consumable is 100% immediately after a new consumable container has been mounted, and then gradually decreases when printing is performed. Therefore, if a remaining amount of the consumable included in a notification is larger than a remaining amount of the consumable included in a previous notification, it can be determined that a new consumable container has been mounted. Further, since the number of sheets printable until one consumable container is used up is determined, if a counter value increases by a predetermined number or more from that at the time of the previous notification, it can be determined that the new consumable container has been mounted. In the third exemplary embodiment, description of a configuration similar to the first exemplary embodiment is omitted, and only a difference therebetween will be described below.

Figure 12:
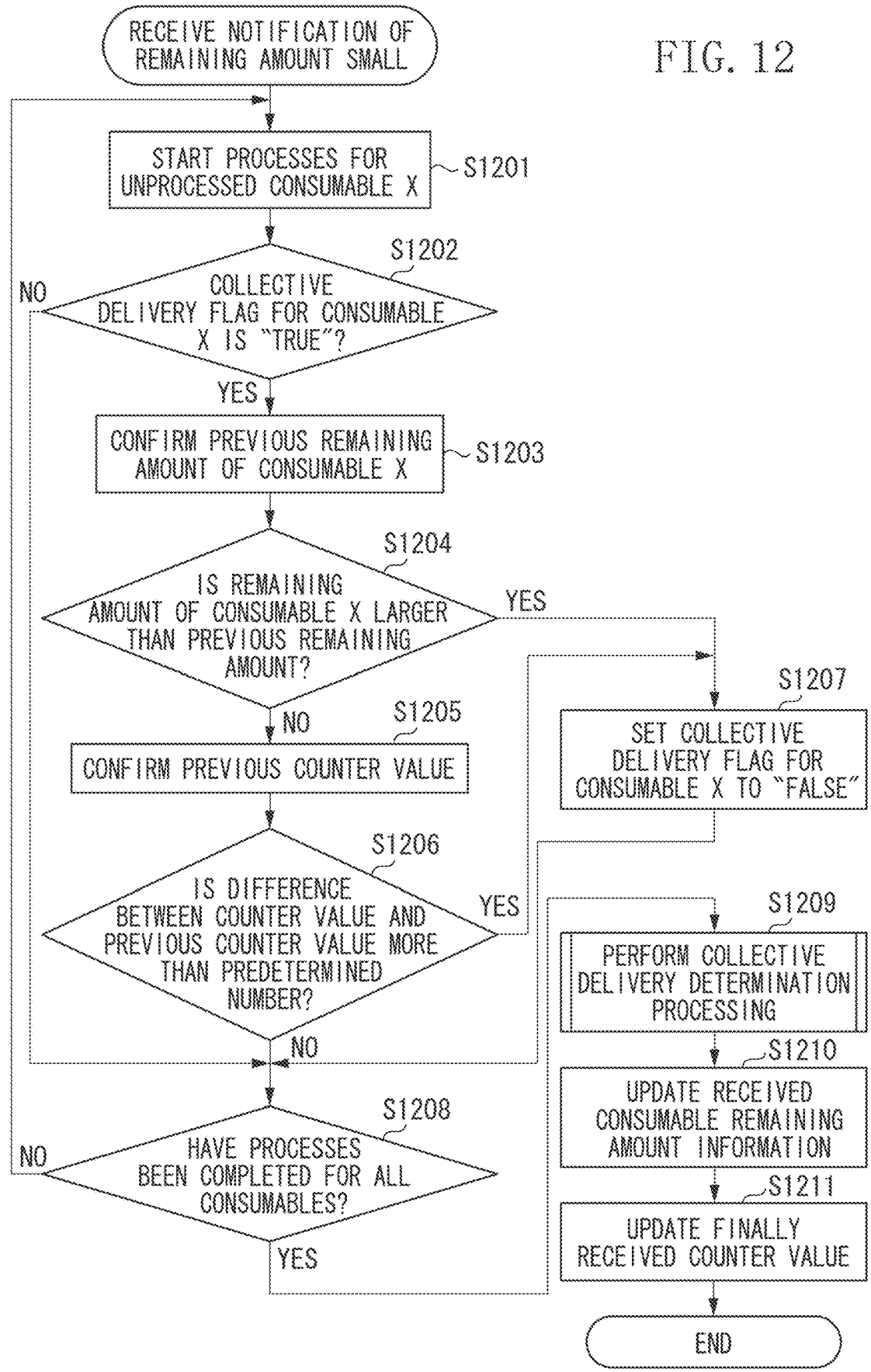
FIG. 12 is a flowchart illustrating delivery control processing according to a third exemplary embodiment.

FIG. 12 is a flowchart for illustrating processing relating to collective delivery (delivery control processing) according to the third exemplary embodiment. The processing in the flowchart is implemented when a CPU 300 reads out a program (a program for collective delivery) stored in a secondary storage device 302 into a main storage device 301 and executes the read program in one or more information processing apparatuses constituting a management system 103. That is, the management system 103 executes all processing steps in the flowchart.

The management system 103 starts the processing in the flowchart upon receiving the consumable remaining amount small notification from the network device 102. Steps S1201 to S1208 are processes each performed for all types of consumables loaded into the network device 102 which has issued the consumable remaining amount small notification.

First, in step S1201, a delivery control unit 403 starts the processes in steps S1202 to S1207 taking one consumable not yet processed (a consumable X) as a processing target.

In step S1202, the delivery control unit 403 determines whether a collective delivery flag 803 for the consumable X is "TRUE". If the delivery control unit 403 determines that the collective delivery flag 803 for the consumable X is "FALSE" (NO in step S1202), the processing directly proceeds to step S1208. The process in step S1208 will be described below.

On the other hand, if the delivery control unit 403 determines that the collective delivery flag 803 for the consumable X is "TRUE" (YES in step S1202), the processing proceeds to step S1203.

In step S1203, the delivery control unit 403 confirms remaining amount information (%) attached to the consumable remaining amount small notification received last time for the consumable X from a delivery management table.

In step S1204, the delivery control unit 403 determines whether remaining amount information in the notification received this time is larger than the remaining amount information received last time for the consumable X.

If the delivery control unit 403 determines that the remaining amount information in the notification received this time is larger than the remaining amount information received last time for the consumable X (YES in step S1204), the processing proceeds to step S1207. The process in step S1207 will be described below.

On the other hand, if the delivery control unit 403 determines that the remaining amount information in the notification received this time is not larger than the remaining amount information received last time for the consumable X (NO in step S1204), the processing proceeds to step S1205. In step S1205, the delivery control unit 403 confirms a counter value received last time using a network device ID, from a network device information table.

In step S1206, the delivery control unit 403 determines whether a difference between a counter value received this time and the counter value received last time is a predetermined number of printed sheets or more. As a predetermined number of printed sheets as a threshold value, an appropriate number of printed sheets is set by which it can be determined that one container of the consumable X is sufficiently used up. For example, a nominal number of printed sheets for a consumable is desirably set.

If the delivery control unit 403 determines that the difference between the counter value received this time and the counter value received last time is the predetermined number of printed sheets or more (YES in step S1206), the processing proceeds to step S1207. In step S1207, the delivery control unit 403 sets the collective delivery flag 803 for the consumable X to "FALSE", and the processing proceeds to step S1208.

On the other hand, if the delivery control unit 403 determines that the difference between the counter value received this time and the counter value received last time is not the predetermined number of printed sheets or more (NO in step S1206), the processing directly proceeds to step S1208.

In step S1208, the delivery control unit 403 determines whether the processes in steps S1202 to S1207 have been completed for all consumables. If the delivery control unit 403 determines that the processes in steps S1202 to S1207 have not been completed for all the consumables (NO in step S1208), the processing returns to step S1201.

On the other hand, if the delivery control unit 403 determines that the processes in steps S1202 to S1207 have been completed for all the consumables (YES in step S1208), the processing proceeds to step S1209.

More specifically, the delivery control unit 403 performs control to set to "FALSE" the collective delivery flag 803 for the consumables, the remaining amounts of which increase from the previous notification, for the network device 102, which has issued the consumable remaining amount small notification. On the other hand, the delivery control unit 403 disables the delivery flag 803 for each of the consumables in the network device 102 when the counter value in the network device 102, which has issued the consumable remaining amount small notification, increases from the counter value previously received by a predetermined number of printed sheets or more.

In step S1209, the delivery control unit 403 performs collective delivery determination processing illustrated in steps S901 to S911 in FIG. 9 in the first exemplary embodiment.

In step S1210, the delivery control unit 403 updates the remaining amount information (%) in the delivery management table using consumable remaining amount information received this time.

In step S1211, the delivery control unit 403 updates the counter value in the network device management table using the counter value received this time, and the processing in the flowchart ends.

As described above, according to the third exemplary embodiment, even when the network device 102 does not have a configuration for detecting that the new consumable has been mounted and notifying the management system 103 thereof, the collective delivery flag 803 for the consumables can be appropriately controlled. As a result, the possibility that omission of delivery occurs is reduced so that more appropriate collective delivery can be implemented.

The one or more consumables in the network device 102, which the management system 103 controls to be collectively delivered, are not limited to consumables belonging to the same category, for example, consumables corresponding to one or more colors, e.g., Yellow, Magenta, Cyan, and Black of recording materials. For example, the management system 103 may be configured to control collective delivery of toners and staples in the network device 102. In this configuration, ancillary information 704 corresponding to the consumable remaining amount small notification also includes a remaining amount of the staple in addition to a remaining amount of the toner of each color.

As described above, in each of the exemplary embodiments, it is determined whether delivery is to be performed or which type of consumables is to be delivered depending on the remaining amount of each consumable in the network device 102. This configuration enables the consumables in the network device 102 to be appropriately collectively delivered while reducing the possibility that double delivery or omission of delivery occurs.

A structure and a content of the various types of data described above, are not limited to those. The data may have various structures and contents depending on the use and the purpose.

While one type of exemplary embodiment has been described above, other types of exemplary embodiments serving as a system, an apparatus, a method, a program, or a recording medium, for example, are applicable. More specifically, the present disclosure can be applied to a system including a plurality of devices or to an apparatus including one device. Combinations of the respective configurations of the above-described exemplary embodiments are also applicable.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-154835, filed Aug. 5, 2016, which is hereby incorporated by reference herein in its entirety.

What is claimed is:

1. A management system for managing a plurality of network devices, comprising:
   a memory storing instructions; and
   a processor that executes the instructions causing the management system to:
   manage a delivery flag to manage delivery of each consumable for each of the plurality of network devices;
   manage remaining amount information for each consumable in each of the plurality of network devices;
   receive a first notification, from at least one network device, notifying that a remaining amount of a consumable has become small, wherein the first notification includes remaining amount information about each consumable in the at least one network device and a counter value indicating a number of printed sheets counted based on print processing performed in the network device that issued the first notification;
   manage the counter value for each network device according to content of the first notification, wherein a previous counter value is also managed according to content of a previous first notification that each network device previously issued;
   disable, when a difference between the counter value included in the first notification and a previous counter value managed according to content of a previous first notification that the network device previously issued is greater than or equal to a predetermined value, the delivery flag for each consumable in the network device that issued the first notification;
   determine, when the delivery flag for a consumable that a remaining amount of which was notified to have become small is invalid, the consumable as a delivery target without enabling the delivery flag for the consumable;
   disable, when the delivery flag for a consumable that a remaining amount of which was notified to have become small is valid, the delivery flag for the consumable without determining the consumable as the delivery target;
   determine, when a remaining amount of another consumable based on the managed remaining amount information satisfies a delivery standard which exists for the at least one network device that issued the first notification and the delivery flag for the another consumable is invalid, the another consumable as a delivery target;
   enable, in a case where the another consumable is determined as the delivery target based on the delivery standard, the delivery flag for the another consumable; and
   update and manage, for the at least one network device, the remaining amount information of each consumable and the previous counter value, based on the content of the first notification.

2. The management system according to claim 1, wherein the delivery standard is that the remaining amount of the consumable is within a specific range.

3. The management system according to claim 1, wherein the instructions further cause the management system to:
   receive a second notification, from the network device, indicating a presence of a new consumable, and
   disable, upon receipt of the second notification, the delivery flag for the new consumable.

4. The management system according to claim 1, wherein the instructions further cause the management system to disable the delivery flag for the consumable that the remaining amount of which was notified in a currently received first notification increased from a remaining amount notified in an immediately preceding received first notification.

5. The management system according to claim 1, wherein the network device is an image forming apparatus.

6. The management system according to claim 5, wherein consumables are containers containing recording materials of different colors.

7. A method for a management system managing a plurality of network devices, comprising:
   managing a delivery flag to manage delivery of each consumable for each of the plurality of network devices;
   managing remaining amount information for each consumable in each of the plurality of network devices;
   receiving a first notification, from at least one network device, notifying that a remaining amount of a consumable has become small, wherein the first notification includes remaining amount information about each consumable in the at least one network device and a counter value indicating a number of printed sheets counted based on print processing performed in the network device that issued the first notification;
   managing the counter value for each network device according to content of the first notification, wherein a previous counter value is also managed according to content of a previous first notification that each network device previously issued;
   disabling, when a difference between the counter value included in the first notification and a previous counter value managed according to content of a previous first notification that the network device previously issued is greater than or equal to a predetermined value, the delivery flag for each consumable in the network device that issued the first notification determining, when the delivery flag for a consumable that a remaining amount of which was notified to have become small is invalid, the consumable as a delivery target without enabling the delivery flag for the consumable;

disable, when the delivery flag for a consumable that a remaining amount of which was notified to have become small is valid, the delivery flag for the consumable without determining the consumable as the delivery target;

determining when a remaining amount of another consumable based on the managed remaining amount information satisfies a delivery standard which exists for the at least one network device that issued the first notification and the delivery flag for the another consumable is invalid, the another consumable as a delivery target;

enabling, in a case where the another consumable is determined as the delivery target based on the delivery standard, the delivery flag for the another consumable; and updating and managing, for the at least one network device, the remaining amount information of each consumable and the previous counter value, based on the content of the first notification.

* * * * *